(12) United States Patent
Davis et al.

(10) Patent No.: US 7,532,259 B2
(45) Date of Patent: May 12, 2009

(54) DYNAMIC APERTURE FOR A LIGHT PROCESSING SYSTEM

(75) Inventors: Michael Terry Davis, Richardson, TX (US); Duane Scott Dewald, Dallas, TX (US); Steve Smith, Coppell, TX (US)

(73) Assignee: Texas Instruments Incorporated, Dallas, TX (US)

( * ) Notice: Subject to any disclaimer, the term of this patent is extended or adjusted under 35 U.S.C. 154(b) by 256 days.

(21) Appl. No.: 11/507,922

(22) Filed: Aug. 22, 2006

(65) Prior Publication Data

US 2008/0062546 A1    Mar. 13, 2008

(51) Int. Cl.
*H04N 5/57* (2006.01)
(52) U.S. Cl. ..................................... 348/743
(58) Field of Classification Search ................. 348/743, 348/759, 742, 744; 353/84; 359/885
See application file for complete search history.

(56) References Cited

U.S. PATENT DOCUMENTS

| | | | |
|---|---|---|---|
| 5,684,567 A * | 11/1997 | Shiozawa | .................... 355/67 |
| 5,717,422 A | 2/1998 | Fergason | |
| 6,215,578 B1 * | 4/2001 | Lin | ............................ 359/292 |
| 6,816,141 B1 | 11/2004 | Fergason | |
| 7,027,161 B2 * | 4/2006 | Pepper | ........................ 356/450 |
| 7,164,397 B2 * | 1/2007 | Pettitt et al. | ................... 345/63 |
| RE39,712 E | 7/2007 | Vogel | |
| 7,252,391 B2 * | 8/2007 | Dewald et al. | ................. 353/84 |
| 7,265,781 B2 | 9/2007 | Noguchi | |
| 7,283,181 B2 * | 10/2007 | Allen et al. | .................. 348/744 |
| 7,289,663 B2 | 10/2007 | Spaulding et al. | |
| 7,298,892 B2 | 11/2007 | Spaulding et al. | |
| 7,327,382 B2 | 2/2008 | Rodriguez et al. | |
| 7,391,475 B2 * | 6/2008 | Pate et al. | ..................... 348/602 |
| 7,421,118 B2 | 9/2008 | Dalrymple | |
| 2006/0152687 A1 * | 7/2006 | Robinson | ...................... 353/97 |
| 2007/0133208 A1 * | 6/2007 | Smith et al. | .................. 362/284 |

* cited by examiner

*Primary Examiner*—Paulos M Natnael
(74) *Attorney, Agent, or Firm*—Wade James Brady, III; Frederick J. Telecky, Jr.

(57) ABSTRACT

A method of processing light includes receiving an image to be displayed. The image has a brightness level. The method further includes generating light from a light source and intensity-modulating the generated light to produce light having a first intensity. The first intensity is a function of the brightness level. The method also includes spatially integrating the intensity-modulated light.

19 Claims, 1 Drawing Sheet

DYNAMIC APERTURE FOR A LIGHT PROCESSING SYSTEM

TECHNICAL FIELD

This invention relates in general to light processing systems and, in particular, to an improved dynamic aperture for enhanced image quality.

BACKGROUND

Many high definition television (HDTV) applications improve the contrast and detail of dark image scenes by using a pupil to reduce light on the screen. One such application is Dynamic Black, utilized in many DLP® HDTV applications. Since HDTV projection lenses are generally of fixed length and have no complicated zoom or focus mechanisms, HDTV applications generally have convenient optical and mechanical access to the projection lens pupil. Optically, the pupil provides a function that minimally affects spatial uniformity. However, conventional HDTV solutions to enhance contrast and detail of dark image scenes are limited for a variety of reasons and are not universally applicable to all types of displays. For example, decreasing the aperture of the lens pupil often increases the f-number of the optical system, thereby increasing visibility of defects while reducing the high-angle rays that pass through the system. The f-number or focal ratio of an optical system expresses the diameter of the entrance pupil in terms of the effective focal length of the lens. Further, it may be desirable to enhance contrast and detail of dark images in displays in formats other than HDTV.

SUMMARY OF THE EXAMPLE EMBODIMENTS

In one embodiment, a light processing system includes a light source, a dynamic aperture, a light-integration module, and a spatial light modulator. The light source is capable of generating light. The dynamic aperture is operable to modulate light intensity generated by the light source. The light-integration module is capable of spatially integrating light received from the dynamic aperture. The spatial light modulator is operable to spatially modulate light received from the light-integration module.

In a method embodiment, a method of processing light includes receiving an image to be displayed. The image has a brightness level. The method further includes generating light from a light source and intensity-modulating the generated light to produce light having a first intensity. The first intensity is a function of the brightness level. The method also includes spatially integrating the intensity-modulated light.

Technical advantages of some embodiments of the invention may include the ability to provide enhanced contrast and detail of darker images with little or no impact to conventional projection display platforms for optical and/or mechanical tooling. Various embodiments may minimize or eliminate image quality defects due to blemish visibility from increasing f-numbers, (the ratio of the focal length of a lens system to the effective diameter of its aperture), common in other approaches. In addition, various embodiments may have little or no impact to spatial uniformity and/or color uniformity with changing aperture size.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and features and advantages thereof, reference is now made to the following description, taken in conjunction with the accompanying drawings, in which.

DESCRIPTION OF EXAMPLE EMBODIMENTS

Particular examples and dimensions specified throughout this document are intended for example purposes only, and are not intended to limit the scope of the present disclosure. In particular, this document is not intended to be limited to a particular spatial light modulator device, such as, a digital micromirror device. Moreover, the illustrations in FIGS. 1 through 2 are not necessarily drawn to scale.

Figure 1:
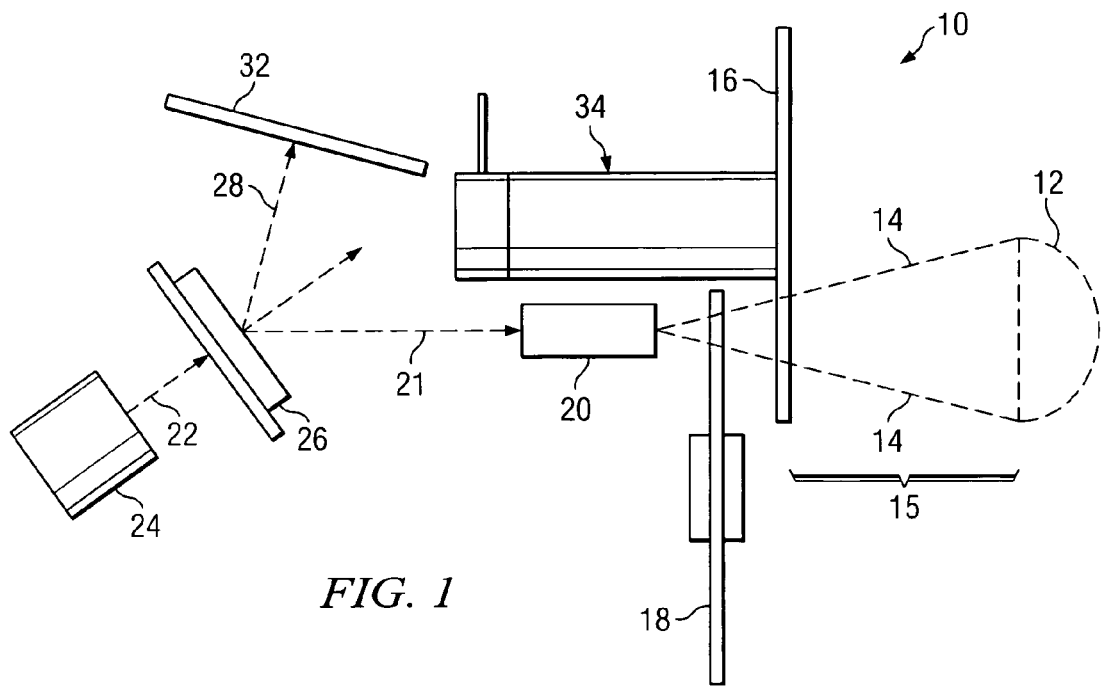
FIG. 1 is a schematic diagram showing portions of a light processing system according to one embodiment of the invention.
Figure 2:
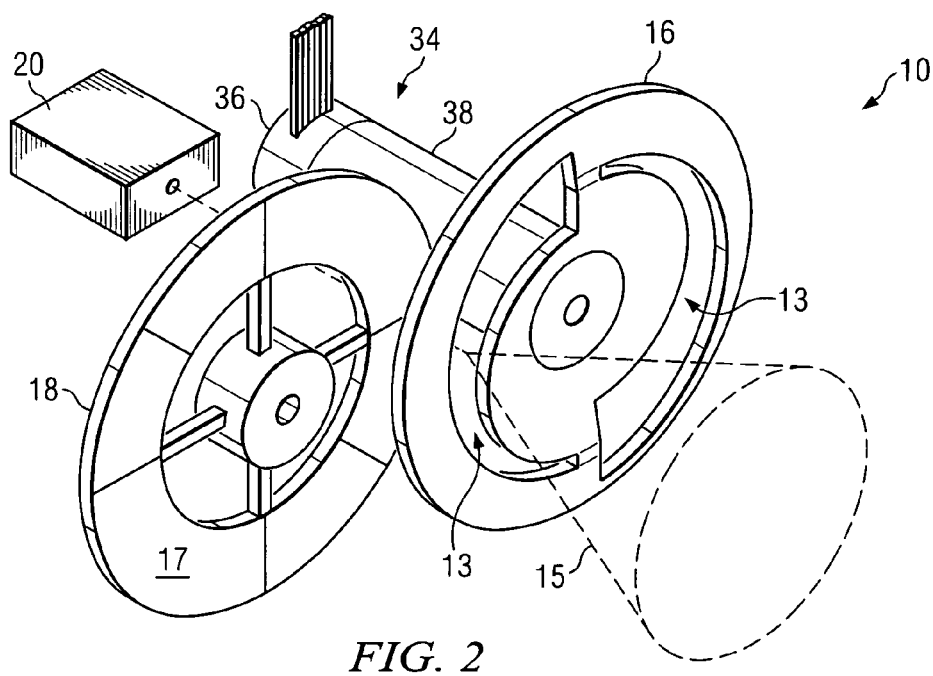
FIG. 2 is a perspective view illustrating a portion of a light processing system according to one embodiment of the invention.

FIG. 1 is a schematic diagram of one embodiment of a portion of a light processing system 10 that may be used with other embodiments of the invention. As shown in FIG. 1, light processing system 10 generally includes a light source 12, a dynamic aperture 16, a light-integration module 20, and a spatial light modulator 26. System 10 further includes a color filter 18, an image processor 24, a dynamic aperture control 34, and a display surface 32. Light processing system 10 is particularly adapted for the display of images by spatial light modulator 26, which transmits, for example through reflection or refraction, selective portions of light emanating from light source 12 for displaying an image on display surface 32.

Light source 12 may be any light generating element capable of generating a radiant energy beam (e.g., light beams 14) in the visual light spectrum. Examples of suitable light generating elements include high-pressure mercury, light emitting diodes (LEDs), incandescent lighting, sodium vapor, metal halide, Xenon, fluorescent, tungsten-halogen lamps, lasers, and the like. In this particular embodiment, a plurality of light beams (e.g., light beams 14) form a light bundle 15.

In this particular embodiment, at least a portion of a light bundle 15 passes through dynamic aperture 16 and color filter 18 before entering light-integration module 20. Dynamic aperture 16 is operable to modulate the light intensity directed at spatial light modulator 26 by blocking or stopping varying portions of incident light bundle 15 from light source 12.

Generating color may be effected by any of a variety of processes. In this particular embodiment, color filter 18 may be any device capable of modulating one of the primary colors (e.g., red, green, and blue) in the light path generated by light source 12. For example, color filter 18 may be a scrolling color wheel or other type of recycling color wheel. Color filter 18 filters incident light bundle 15 so as to provide field sequential images. In addition, color filter 18 enables system 10 to generate a sequence of differently colored images that are perceived at display surface 32 by a viewer as a correctly colored image. Although this example uses a color wheel to generate color, other means may be used without departing from the scope of the present disclosure. For example, other embodiments may use a light source capable of generating specific colors of light, and thus color filter 18 is omitted.

Light-integration module 20 may be any device capable of spatially integrating light. In this particular embodiment, light-integration module includes an integrator rod (or tunnel). As will be shown, various embodiments may position dynamic aperture 16 relative to integration module 20 to reduce the overall cost and size requirements for light processing system 10 while significantly improving image quality and reliability over conventional designs.

Spatial light modulator 26 may comprise any device capable of selectively communicating at least some of the received light beams (e.g., incident light beam 21) along a projection light path (e.g., light path 28). In this particular embodiment, spatial light modulator 26 comprises a plurality of reflective micromirrors corresponding to the arrangement and quantity of pixels displayed on display surface 32. In various embodiments, the quantity of pixels displayed may be a function of the number of reflective micromirrors. One device particularly suited to provide such an arrangement and quantity of reflective pixilated surfaces is a digital multi-mirror device (DMD) available from Texas Instruments Inc. Other embodiments may spatially-modulate light by alternative means. For example, in various embodiments, spatial light modulator 26 may be a liquid crystal display or a liquid crystal on silicon display.

Image processor 24 may comprise any device capable of providing an image signal 22 that controls the selective transmission of spatial light modulator 26. In addition, image processor 24 is capable of computing the brightness information of a particular image or scene and communicating the brightness information to dynamic aperture control 34.

As further explained in FIG. 2, dynamic aperture control 34 is capable of controlling dynamic aperture 16 to modulate light intensity received by spatial light modulator 26.

Conventional display systems that modulate light intensity in a projection lens are often inherently limited. For example, decreasing the aperture of the lens pupil often increases the f-number of the optical system, thereby increasing visibility of defects while reducing the high-angle rays that pass through the system. The f-number or focal ratio of an optical system expresses the diameter of the entrance pupil in terms of the effective focal length of the lens. Additionally, reflective apertures or pupils in a projection lens may reduce the contrast-ratio of the display while light-absorptive apertures may negatively affect the heat load on the actuator. Moreover, front-projection applications, such as high definition home theater, have especially limited access to the pupil plane because of additional components conventionally used to adjust the screen size and focal distance. Although some alternative solutions utilize an aperture outside the projection lens, such solutions inadequately address requirements of many conventional display engines. For example, front-projectors typically have limiting weight and size requirements for portability or aesthetic reasons. Similarly, many conventional solutions lack low-cost, drop-in compatibility with existing platforms.

Unlike conventional light processing systems, light processing system 10 spatially-integrates light bundle 15 by integration module 20 after intensity-modulating light bundle 15 by dynamic aperture 16 to enhance the image quality and contrast of darker scenes. This particular embodiment provides an improved and more versatile image-enhancing solution with little or no impact to conventional optical and/or mechanical tooling. To illustrate, light-integration module can minimize or eliminate the impact to spatial uniformity due to, for example, changes in effective f-number from stopping down light bundle 15 by dynamic aperture 16. Likewise, this particular embodiment minimizes or eliminates spatial and/or color uniformity due to changing the size of aperture opening 13 disposed in the path of light bundle 15. As will be shown in FIG. 2, the shape and position of dynamic aperture 16 may minimize or eliminate any uniformity impact and/or depth-of-focus blemish visibility issues. These advantages add even more utility to integrator module 20.

The proximity of dynamic aperture 16 to the focal point of light bundle 15 minimizes the dimensions of aperture openings 13 and the overall size of dynamic aperture 16. Thus, it will be appreciated that the features of light processing system 10 greatly facilitate the use of motors and actuators commonly used in conventional projection display platforms. Additionally, this particular embodiment improves reliability for a variety of reasons. For example, positioning dynamic aperture 16 between light source 12 and color filter 18 provides some degree of additional protection to color filter 18 should the light source fail with "extreme prejudice." As explained further in FIG. 2, a reflective dynamic aperture 16 may increase reliability and light efficiency over conventional applications, without compromising contrast-ratio.

FIG. 2 is a perspective view of one embodiment of a portion of a light processing system 10. As previously shown in FIG. 1, light source 12 generates light bundle 15 that is focused onto light integration module 20 through dynamic aperture 16 and color filter 18.

Intensity-modulating light bundle 15 by dynamic aperture 16 may be effected through any of a variety of means. In this particular embodiment, dynamic aperture 16 comprises a disc approximately 50 mm in diameter and approximately 1 mm thick. Although this embodiment uses a disc having a 50 mm diameter and a 1 mm thickness, other shapes or dimension may be used without departing from the scope of the present disclosure. In addition, other forms of mechanical shutters may be used without departing from the scope of the present invention.

In this embodiment, dynamic aperture 16 has two aperture openings 13 shaped similar to an Archimedes spiral. Although various embodiments may use any number of aperture openings or shapes, dynamic aperture 16 uses two symmetrical aperture openings 13 for optimal mechanical balance and light attenuation efficiency. In addition, the spiral-shaped aperture openings 13 enhance the uniformity and seamlessness of light modulation by dynamic aperture 16 as it rotates.

Formation of dynamic aperture 16 may be effected through any of a variety of processes. For example, dynamic aperture 16 may be stamped from chromed aluminum or nickel-plated aluminum. Forming dynamic aperture 16 from reflective material minimizes the heat load from direct illumination. In addition, dynamic aperture 16 may be shaped to recycle light between the dynamic aperture surface and reflective surfaces of light source 12, thereby increasing the efficiency of light processing system 10. Dynamic aperture 16 may be further shaped to allow enough high angle light beams 14 to pass into the light-integration module 20 to effectively preserve the full numerical aperture of system 10 and minimize or eliminate any uniformity impact and/or depth-of-focus blemish visibility issues.

Dynamic aperture control 34 may be any device capable of controlling the degree of light intensity modulation by dynamic aperture 16. In this particular embodiment, dynamic aperture control 34 includes a standard brushless motor 38 driven by encoder feedback 36 mounted on the back of the motor 38. In addition, dynamic aperture control 34 is operable to rotate dynamic aperture 16 to control the size of aperture opening 13 disposed within light bundle 15. In this particular embodiment, dynamic aperture control 34 is "hidden" from light bundle 15 and situated along the length of light-integration module 20 for minimal engine size impact.

In addition, motor 38 is in a position where cooling air flow is likely to already be available, thus helping keep motor temperature minimized for higher reliability.

In this particular embodiment, color filter 18 includes a color wheel 18 divided into color segments (e.g., color segment 17) each segment capable of filtering light bundle 15 to provide field sequential images.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A light processing system comprising:
    a light source operable to generate light;
    a spatial light modulator operable to selectively reflect light generated by the light source in response to receiving an image signal, the image signal comprising an image brightness level;
    a dynamic aperture operable to modulate light intensity generated by the light source in response to receiving a control signal;
    a dynamic aperture control operable to provide the control signal to the dynamic aperture, the control signal being a function of the image brightness level; and
    a light integration rod capable of spatially integrating light received from the dynamic aperture.

2. The light processing system of claim 1, and further comprising a color filter capable of selectively filtering light received from the dynamic aperture.

3. A light processing system comprising:
    a light source capable of generating light;
    a dynamic aperture operable to modulate light intensity generated by the light source based on a function of an image brightness level;
    a light-integration module capable of spatially integrating light received from the dynamic aperture; and
    a spatial light modulator operable to spatially modulate light received from the light-integration module in response to receiving the image signal, the image signal comprising an image brightness level.

4. The light processing system of claim 3, wherein the light source is operable to focus the generated light to a focal point, the dynamic aperture positioned between the focal point and the light source.

5. The light processing system of claim 3, and further comprising a color filter capable of selectively filtering light received from the dynamic aperture.

6. The light processing system of claim 5, wherein the color filter comprises a color wheel.

7. The light processing system of claim 3, wherein the dynamic aperture comprises a disc having at least one opening, the at least one opening configured to modulate light intensity as the disc rotates.

8. The light processing system of claim 7, wherein the at least one opening is spiral-shaped.

9. The light processing system of claim 7, wherein the disc comprises at least two openings, the two openings having equal widths along at least a majority of the diameters of the disc.

10. The light processing system of claim 3, wherein the dynamic aperture comprises at least one reflective surface.

11. The light processing system of claim 10, wherein at least a portion of the dynamic aperture comprises a surface configured to cycle the generated light between the dynamic aperture and the light source.

12. The light processing system of claim 3, and further comprising an aperture control system capable of dynamically controlling the amount of light modulated by the dynamic aperture.

13. The light processing system of claim 3, wherein the spatial light modulator comprises a device selected from the group consisting of:
    a liquid crystal display device;
    a liquid crystal on silicon display device; and
    a digital micromirror device.

14. A method of processing light comprising:
    generating light from a light source;
    receiving an image to be displayed, the image having a brightness level;
    intensity-modulating the generated light to produce light having a first intensity, the first intensity being a function of the brightness level;
    spatially integrating the intensity-modulated light; and
    selectively reflecting the spatially-integrated light by a spatial light modulator.

15. The method of claim 14, wherein intensity-modulating the generated light comprises rotating at least one disc having at least one opening.

16. The method of claim 15, wherein rotating at least one disc having at least one opening comprises rotating at least one disc having at least one opening shaped similar to an Archimedes spiral.

17. The method of claim 14, wherein generating light from a light source comprises focusing the generated light to a focal point; and
    wherein intensity-modulating the generated light comprises intensity-modulating the generated light at a position between the focal point and the light source.

18. The method of claim 14, and further comprising filtering specific wavelengths of the generated light prior to selectively reflecting the spatially-integrated light by a spatial light modulator.

19. The method of claim 12, and further comprising cycling the generated light between the dynamic aperture and the light source.

\* \* \* \* \*